(12) United States Patent
Smith

(10) Patent No.: US 7,038,791 B2
(45) Date of Patent: May 2, 2006

(54) SIGNAL-TO-NOISE RATIO TUNED ADAPTIVE OPTICS CONTROL SYSTEM

(75) Inventor: Carey A. Smith, Camarillo, CA (US)

(73) Assignee: The Boeing Company, Chicago, IL (US)

( * ) Notice: Subject to any disclaimer, the term of this patent is extended or adjusted under 35 U.S.C. 154(b) by 400 days.

(21) Appl. No.: 10/603,228

(22) Filed: Jun. 25, 2003

(65) Prior Publication Data

US 2005/0006559 A1    Jan. 13, 2005

(51) Int. Cl.
*G01B 9/02* (2006.01)

(52) U.S. Cl. ..................................... 356/520
(58) Field of Classification Search ................ 356/520; 250/201.1, 201.9, 234
See application file for complete search history.

(56) References Cited

U.S. PATENT DOCUMENTS

| | | | | |
|---|---|---|---|---|
| 4,518,854 A | * | 5/1985 | Hutchin | 356/521 |
| 4,690,555 A | * | 9/1987 | Ellerbroek | 356/121 |
| 4,750,818 A | * | 6/1988 | Cochran | 359/300 |
| 6,163,381 A | | 12/2000 | Davies et al. | |

OTHER PUBLICATIONS

"Adaptive Optics for Astronomical Telescopes" by John W. Hardy, Oxford University Press, 1998, pp. 31-33, 55-57, 63-69.

* cited by examiner

*Primary Examiner*—Gregory J. Toatley, Jr.
*Assistant Examiner*—Michael A. Lyons
(74) *Attorney, Agent, or Firm*—Thompson Coburn LLP

(57) ABSTRACT

An improved, adaptive optics control system having a signal-to-noise ratio-tuned wavefront corrector is disclosed. The system comprises a wavefront corrector, a wavefront sensor, a wavefront reconstructor and a wavefront controller. The wavefront corrector has a surface controlled by a plurality of actuators. The wavefront slope sensor has a subaperture separation mechanism for defining a plurality of subapertures through which the distorted wavefront can pass, each subaperture corresponding to an actuator of the wavefront corrector. The wavefront slope sensor produces a wavefront sensor output signal for each subaperture indicative of the distortion of the wavefront. The wavefront reconstructor is adapted to receive the wavefront sensor output signals and calculate corresponding phase estimates based thereon, each phase estimate having a signal-to-noise ratio. The wavefront reconstructor generates a plurality of correction signals to be applied to each of the actuators of the wavefront corrector, each correction signal having a bandwidth. The wavefront controller is adapted to selectively adjust the bandwidth of each correction signal based on the signal-to-noise ratio of the corresponding phase estimate of the actuator to which it is to be applied. A method of optical wavefront distortion correction is also disclosed.

20 Claims, 3 Drawing Sheets

SIGNAL-TO-NOISE RATIO TUNED ADAPTIVE OPTICS CONTROL SYSTEM

CROSS REFERENCE TO RELATED APPLICATIONS

None.

STATEMENT REGARDING FEDERALLY SPONSORED RESEARCH OR DEVELOPMENT

None.

BACKGROUND OF INVENTION

The present invention relates to an improved adaptive optics control system and in particular, to a signal-to-noise ratio-tuned wavefront corrector for use therein.

Optical wavefronts are subject to distortion when passed through certain mediums. These distortions can degrade the quality of images of an object being observed through an image-forming device such as a camera or telescope. Such distortions and degradations can be especially severe and problematic in turbulent mediums such as the atmosphere. Some of the diffractive effects of such turbulence include image blurring caused by the turbulence aberrations, scintillation caused by propagation through strong turbulence, and speckle caused by coherent scattering from diffuse objects.

Various adaptive optic control systems, mechanisms and methods have been developed to try to correct for the blurring that results from such distorted wavefronts. One such control system for use with telescopes, often referred to as a "tip-tilt" correction, involves tilting the secondary mirror of the telescope several times a second to reduce or eliminate the dancing motion of the image. This method, however, only provides a small improvement in the sharpness of the image in applications involving large telescopes.

Various other adaptive optics control systems have been developed to try to better compensate for such distortions. Examples of various such systems are disclosed in "Adaptive Optics for Astronomical Telescopes," by John W. Hardy, 1998 (pages 31–33, and 55–69), which is incorporated herein by reference. Such control systems typically include a wavefront slope sensor for measuring the phase differences or phase slopes between points of a wavefront, a wavefront reconstructor for estimating the wavefront phase from the phase differences, a control system for reducing the effects of noise, and a wavefront corrector for correcting the wavefront based thereon. The wavefront sensor is usually in the form of a Hartmann wavefront sensor as shown in FIG. 2. Hartmann wavefront sensors use an array of lenslets or a mask pierced with holes for dividing the distorted wavefront into an array of subapertures. Each of the beams in the subapertures is focused onto one or more detectors disposed behind the holes or lenslets. When the distorted wavefront passes through the holes or lenslets, it forms an array of spots on the detectors, which are indicative of the local wavefront slope or tilt, if any, in the corresponding subaperture. Typically, the wavefront slope sensor includes an analog-to-digital converter and one or more processors to compute the wavefront slopes.

The wavefront corrector is usually in the form of a deformable mirror which compensates for such distortions. Deformable mirrors typically comprise a face plate to the back of which a plurality of actuators are secured. The actuators expand or contract in length upon application of a voltage or a magnetic field in accordance with the electrical commands generated by the wavefront reconstructor, thereby pushing or pulling on the faceplate and causing the mirror to change its shape to make the appropriate corrections to the distorted waveform. The actuators are typically arranged in a square or hexagonal array defining a plurality of zones, and are capable of displacing the faceplate locally within each zone by a few micrometers up or down.

Current wavefront slope sensors, however, are subject to various measurement errors that degrade wavefront correction. First, there is noise in each measurement, including read-out noise and dark-current noise in the detector and shot noise in the received light. Second, diffractive crosstalk can be produced among adjacent subapertures. Third, the subapertures and detectors may be misaligned. Fourth, partially filled lenslets can cause stretching of the spot size on the detectors. Fifth, the intensity across each lenslet may not be uniform, which can also change the spot sizes and shapes. In addition, Hartmann wavefront sensors are unable to provide accurate wavefront phase slope measurements in some subapertures during conditions of severe turbulence due to large variations in the intensity and phase within a subaperture. One approach to minimize such effects is to combine a Hartmann sensor with another device, such as a unit shear lateral shearing interferometer wavefront sensor as is disclosed in U.S. Pat. No. 4,518,854, which is incorporated herein by reference.

Further, conventional control systems assume that all of the subaperture-based measurements are of equal quality and that all of the computed signals for the wavefront corrector actuators are of equal quality. However, the measurements in the edge subapertures (i.e., around the outer aperture, around interior obscurations, or in the vicinity of struts) are typically only partially filled, and so have lower signal-to-noise ratios and are of a lesser quality than the measurements in the interior subapertures. The wavefront correction signals for edge actuators are also typically of a lesser quality than those corresponding to non-edge actuators, due in part to the fact that the quantity of data in the vicinity edge actuators is limited and due to the fact that the estimate of the phase for each actuator is dominated by the data in the vicinity of the corresponding subaperture. Therefore, the correction signals for such edge actuators can be extremely noisy, making the system unstable. As a result, the overall bandwidth of such control systems is often reduced to the level of the least stable actuator estimate. Such a limitation on the bandwidth, however, can significantly degrade the performance of the system.

As a result, there is a need for an improved, adaptive optics control system which overcomes these problems.

BRIEF SUMMARY OF THE INVENTION

An adaptive optics control system for distorted optical wavefronts having a wavefront corrector, a wavefront slope sensor, a wavefront reconstructor and a wavefront controller is disclosed. The wavefront corrector has a surface controlled by a plurality of actuators. The wavefront slope sensor has subaperture separation means for defining a plurality of subapertures through which the distorted wavefront can pass, the wavefront slope sensor being adapted to measure the wavefront slope through each subaperture and generate a wavefront slope sensor output signal for each subaperture indicative of the distortion of the wavefront. The wavefront reconstructor is adapted to receive the wavefront slope sensor output signals and calculate a phase estimate for each of the actuators of the wavefront corrector, the phase estimate having a signal-to-noise ratio. The wavefront reconstructor is further adapted to generate a plurality of correction signals, each having a bandwidth, based on said phase estimates. The wavefront controller is adapted to selectively adjust the bandwidth of each correction signal based on the signal-to-noise ratio of the estimated phase calculated by the wavefront.

In one embodiment, the wavefront controller is adapted to reduce the bandwidth of the correction signals for actuators having corresponding phase estimates with a low signal-to-noise ratio, and increase the bandwidth of the correction signals for actuators having corresponding phase estimates with a high signal-to-noise ratio. In another embodiment, the bandwidth of each correction signal is proportional to the signal-to-noise ratio of the corresponding estimated phase. The wavefront corrector may comprise, without limitation, a deformable mirror or a spatial light modulator. The subaperture separation means may comprise, without limitation, an array of lenslets and a corresponding detector array having a plurality of pixels disposed behind each lenslet, each lenslet defining a subaperture, a lateral shearing interferometer, or both. The wavefront slope sensor preferably comprises means for individually calibrating each wavefront slope measured by the wavefront slope sensor.

A method of optical wavefront distortion correction using a wavefront corrector having a surface controlled by a plurality of actuators is also disclosed. The method comprises measuring the distortion of the wavefront with a wavefront slope sensor having subaperture separation means for defining a plurality of subapertures through which the distorted wavefront can pass, the wavefront slope sensor being adapted to measure the wavefront slope through each subaperture and generate a wavefront sensor output signal for each subaperture indicative of the distortion of the wavefront, calculating a phase estimate for each of the actuators of the wavefront corrector based on the wavefront sensor output signals, each phase estimate having a signal-to-noise ratio, generating a plurality of correction signals to be applied to each actuator based on the phase estimates, each correction signal having a bandwidth, and selectively adjusting the bandwidth of each correction signal based on the signal-to-noise ratio of the corresponding estimated phase. The method may further comprise reducing the bandwidth of correction signals of actuators having corresponding phase estimates with a low signal-to-noise ratio, and increasing the bandwidth of correction signals of actuators having corresponding phase estimates with a high signal-to-noise ratio. The method may further comprise selectively adjusting the bandwidth of each correction signal to be proportional to the signal-to-noise ratio of the corresponding estimated phase. The method may also further comprise individually calibrating each wavefront slope measured by the wavefront slope sensor. The step of calculating a phase estimate may comprise representing the wavefront corrector and wavefront slope sensor measurements as a plurality of linear equations in a matrix format.

DETAILED DESCRIPTION OF THE INVENTION

Figure 1:
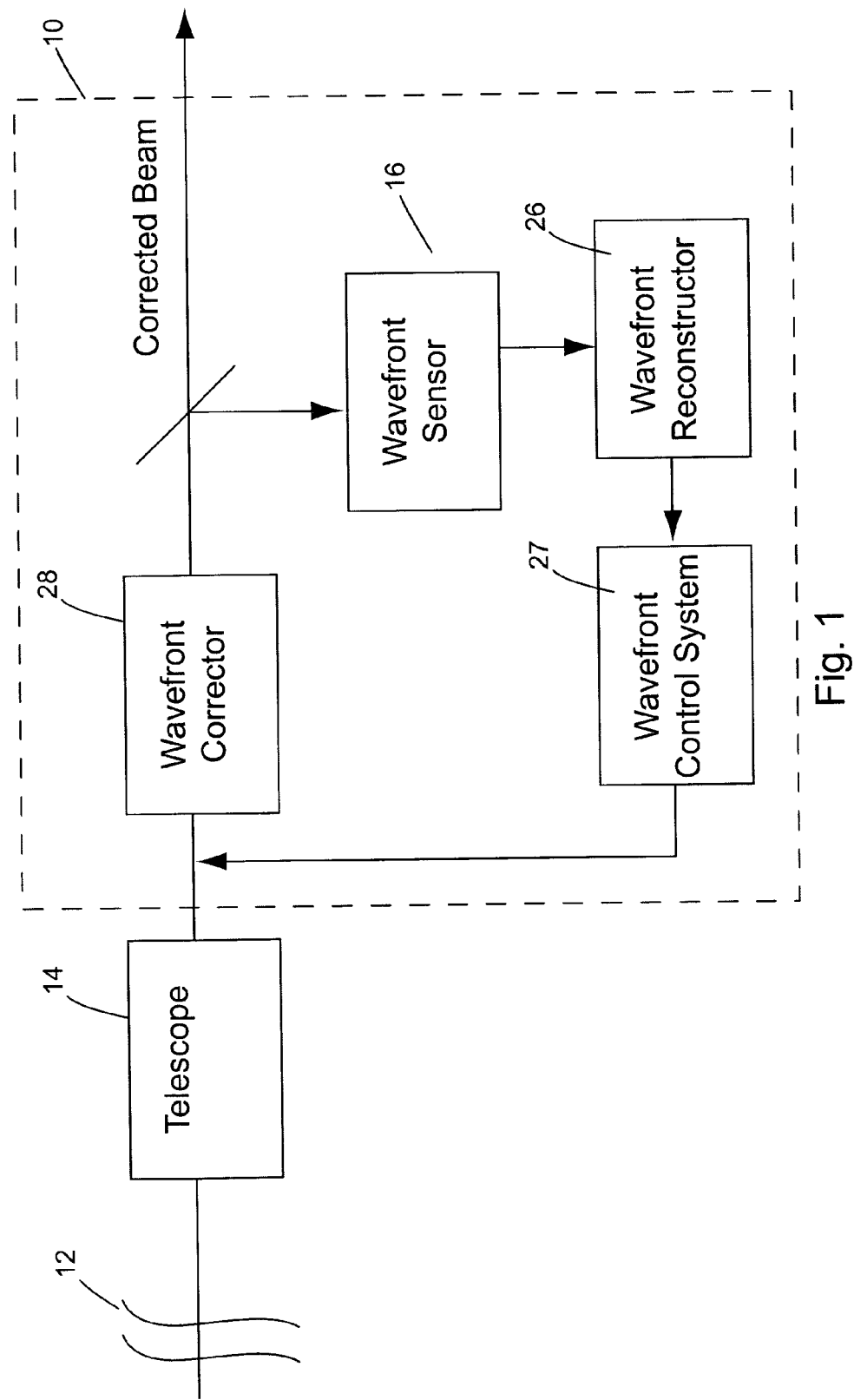
FIG. 1 is a block diagram representing an adaptive optics control system in accordance with one embodiment of the present invention.

An adaptive optics control system 10 for correcting distortions in a wavefront 12 in accordance with one embodiment of the present invention is shown in FIG. 1. While the system will be discussed in connection with a telescope 14 for space observations, it can be appreciated that it can be used with any device and in connection with any medium involving optical wavefronts which are subject to distortion. The system 10 is a closed loop system consisting generally of a wavefront slope sensor 16, a wavefront reconstructor 26, a wavefront control system 27 and a wavefront corrector 28.

Figure 4:
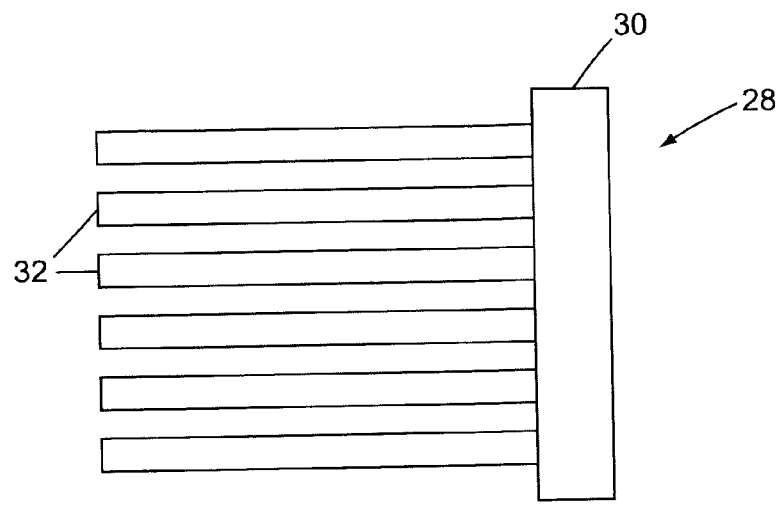
FIG. 4 is a cross-sectional view of one embodiment of the wavefront corrector of FIG. 1.
Figure 5:
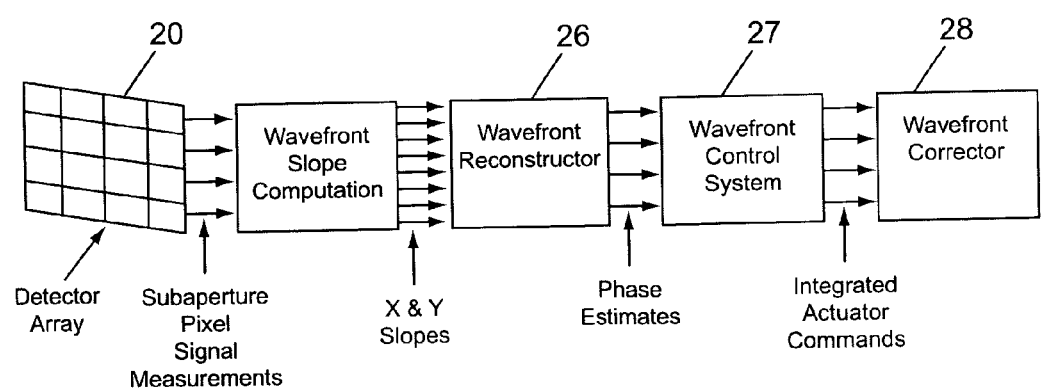
FIG. 5 is a diagram of the signal processing of the adaptive optics control system of FIG. 1.

While the wavefront corrector will be discussed in connection with a deformable mirror, it can be appreciated that any spatial light modulator may be used and the term deformable mirror as used herein applies to both. As shown in FIG. 4, the deformable mirror 28 comprises a thin reflective surface 30 controlled by a plurality of actuators 32 secured to the back thereof. In a preferred embodiment, the actuators 32 are piezo-electric actuators, but it can be appreciated that any type of actuator may be used. The size of a deformable mirror may vary depending on the application, ranging in size from about five centimeters in diameter for a small mirror with 21 actuators, to up to about forty centimeters in diameter for a large mirror with 2,000 actuators. In addition, while not shown, a steering mirror may be positioned in front of the wavefront corrector in order to optimize the correction range of the deformable mirror.

Figure 2:
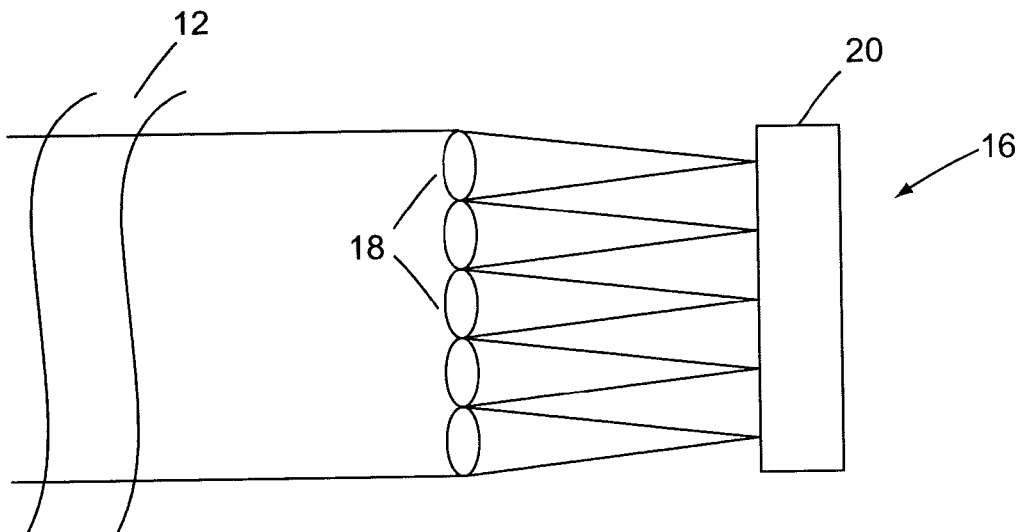
FIG. 2 is a diagram of one embodiment of the wavefront sensor of FIG. 1.

Referring back to FIG. 1, the wavefront slope sensor 16 receives the distorted wavefront 12 and measures the departure of the wavefront from a plane wave. One well known embodiment of a wavefront sensor known as a Hartmann wavefront sensor is shown in FIG. 2 and disclosed in U.S. Pat. No. 4,518,854. However, other sensors may be used, such as a lateral shearing interferometer as disclosed in U.S. Pat. No. 6,163,381, and Shack, Roland V. and B. C. Platt, "Production and use of a Lenticular Hartmann Screen," J. Opt. Soc. Am. (Journal of the Optical Society of America) 1971, pages 67, 81–86, both of which are incorporated herein by reference. The wavefront slope sensor 16 uses an array of lenslets 18 for dividing the distorted wavefront 12 into a plurality of subapertures. It can be appreciated, however, that any means for subaperture separation may be used. Wavefront slope sensor 16 includes a corresponding detector array 20 having a plurality of pixels (not shown) disposed behind each lenslet 18 of the wavefront slope sensor 16 and aligned therewith. Typically, the detector array is a focal plane array, such as a charge coupled device (CCD) camera. However, any type of detector array may be used.

Figure 3A:
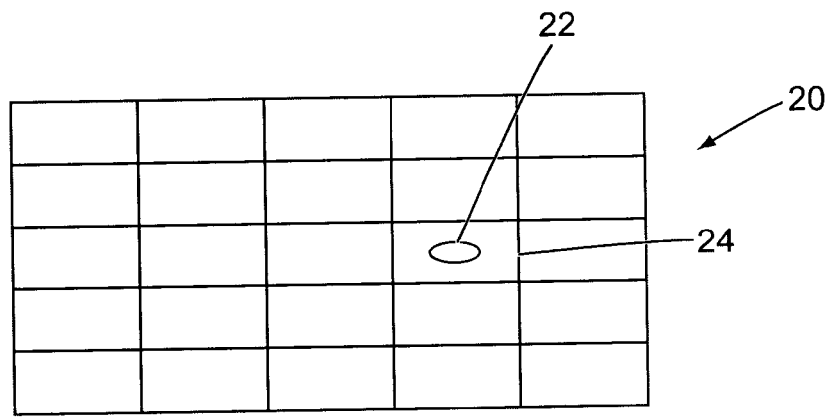
FIG. 3A is a diagram of the detector of FIG. 2.
Figure 3B:
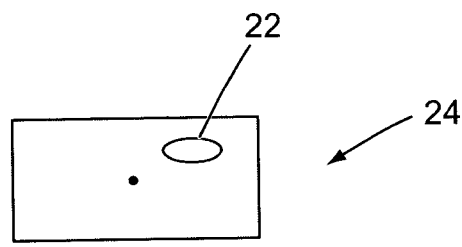
FIG. 3B is a diagram of a detector zone of the detector of FIG. 3A.

In a preferred embodiment as shown in FIG. 3A, the array of lenslets 18 and detector array 20 are each in the form of a two-dimensional array or matrix made up of a plurality of subaperture zones (not shown) and detector zones 24, respectively. The size of each array may vary depending on the particular application. The number of lenslets 18, however, is preferably selected to correspond to the number of actuators 32 of the wavefront corrector 28. As shown in FIG. 3B, when the distorted wavefront 12 passes through the lenslets 18, it produces a corresponding array of spots 22 within each detector zone 24. The location of the centroid of each spot 22 in the detector array 20 is indicative of the local wavefront slope or tilt, if any, in the corresponding subaperture. In a preferred embodiment, separate wavefront sensors are used to sense tilts in two orthogonal axes; namely the X and Y axes. However, a single wavefront sensor may sense tilts in both orthogonal axes simultaneously.

In a preferred embodiment, the slope of each subaperture is computed measuring the centroid of the light on the pixels of each subaperture and multiplying this centroid by a constant to convert it to a slope. The centroid may be computed in a number of ways including, without limitation, using all of the subapertures pixels, or a predetermined subset, or using just the pixels with values above some threshold. The slope conversion constant depends on the focal length of the lenslet, the wavelength of the light, the size of the pixels, and on the units needed for the wavefront reconstructor 26 (e.g., radians of tilt or delta phase per subaperture). The slope conversion factors are calibrated for each subaperture by applying known tilts to the wavefront. The ratio of actual tilt to the measured slope minus the bias is the slope conversion factor. The bias is represented as the slope measured when an undistorted wavefront is detected. The biases can be computed in several ways. In one embodiment, a local laser with a clean (flat) wavefront is put into the system. This local signal is averaged over many measurements (frames) to remove the effect of noise. A few hundred frames is generally sufficient. Since the input signal is error-free, the averaged measured signal is the bias. In another embodiment, a reasonably bright star is imaged and the measurements are averaged over many seconds of data to average out not only the noise, but also the atmospheric turbulence. With such a configuration, the bias and slope-conversion factors can be individually calibrated for each subaperture of the wavefront slope sensor 16. The output slope computed by the wavefront slope sensor 16 is then the "raw" slope minus the bias.

The output of the wavefront slope sensor 16 consists of a plurality of output signals corresponding to an array of zonal measurements from each detector zone 24 representing the local wavefront slopes of each subaperture in two orthogonal axes. Referring back to FIG. 1, the wavefront sensor output signals are transmitted to the wavefront reconstructor 26 which then generates a corresponding plurality of wavefront phase estimates based thereon. The wavefront reconstructor 26 includes an analog-to-digital converter (not shown) for converting the analog output signals of the wavefront slope sensor 16 to digital output signals, and one or more processors (also not shown) for processing the digital output signals to generate the correction signals needed to correct the distorted wavefront. It is understood by one skilled in the art that many processors are suitable for this purpose.

The wavefront reconstructor 26 translates the subaperture tilt measurements represented by each digital output signal into a plurality of phase estimates for each actuator of the deformable mirror 28. Specifically, given the measured slopes sensed by the wavefront slope sensor 16, each having some measurement error, the wavefront reconstructor 26 determines the best estimate of the wavefront phase at the actuator locations of the wavefront corrector 28 that gave rise to the slopes measured by the wavefront slope sensor 16. There are multiple approaches to wavefront phase reconstruction, any one of which may be used without affecting the innovation of the present invention. One approach constructs multiple paths between actuators and averages them. Another approach uses well known statistical methods. The most common method is to treat the wavefront phase reconstruction process as a system of linear equations represented in a matrix format. The mathematics associated with this approach is well known to those skilled in the art of numerical methods for linear algebra. One method is described in William H. Press, et al, *Numerical Recipes in C: The Art of Scientific Computing*, Cambridge University, 1992, which is incorporated herein by reference, and routines for this method are available in software such as The MathWorks, Inc.'s MATLAB product.

One embodiment of solving the wavefront phase reconstruction problem is as a system of linear equations, defined by the following parameters:

M=the number of actuators;

N=the number of subapertures (typically, N=2M);

$$\underline{S_x} = \begin{bmatrix} s_{x1} \\ s_{x2} \\ \vdots \\ s_{xN-1} \\ s_{xN} \end{bmatrix}$$

= the vector of wavefront slopes in the $x$-direction measured by the wavefront slope sensor;

$$\underline{S_y} = \begin{bmatrix} s_{y1} \\ s_{y2} \\ \vdots \\ s_{yN-1} \\ s_{yN} \end{bmatrix}$$

= the vector of wavefront slopes in the $y$-direction measured by the wavefront slope sensor;

$$\underline{S} = \begin{bmatrix} \underline{S_x} \\ \underline{S_y} \end{bmatrix} = \begin{bmatrix} S_{x1} \\ \vdots \\ S_{xN} \\ S_{y1} \\ \vdots \\ S_{yN} \end{bmatrix}$$

= the combined vector of $x$ and $y$ wavefront slopes; and $$\underline{A} = \begin{bmatrix} a_1 \\ a_2 \\ \vdots \\ a_{M-1} \\ a_M \end{bmatrix}$$

= the vector of the heights of the actuators 32 of wavefront corrector 28.

If an actuator 32 of the wavefront corrector 28 is pushed, then the response to that actuator is measured by the wavefront slope sensor 16 and represented in the wavefront slopes. A response matrix, R, of N rows and M columns representing the combination of all the actuators 32 being pushed on in sequence is defined as follows:

$$\underline{\underline{R}} = [\underline{S_1}\ \underline{S_2}\ \ldots\ \underline{S_{M-1}}\ \underline{S_M}]$$

The expected response to an arbitrary vector, $a$, of actuator positions is a linear combination of the responses to individual actuators. This can be written in matrix notation as:

$$\underline{S} = \underline{\underline{R}}a \qquad (1)$$

and assumes that the slope response to an individual actuator is linear with the magnitude of the push, and that the response to multiple pushes is the sum of the individual pushes. Since this assumption is not perfectly true, it can be improved upon, if required, through experiment by pushing on individual actuators and groups of actuators and measuring the surface of the wavefront corrector with a commercially available interferometer.

The solution to the wavefront reconstruction problem (i.e., the estimation of the wavefront phase at the actuator locations of the wavefront corrector 28) consists of finding an inverse of the actuator response equation set forth above, (equation (1)). A "least-squares" approach as is well known to those of ordinary skill in the art is used to find the solution, $\hat{p}$ that minimizes the sum of the squares of the differences between the measurements expected from the solution and the actual measurements. Namely, $\hat{p}$ minimizes as set forth below:

$$e = \Sigma(\underline{S} - \underline{\hat{S}})^2$$

where $$\underline{\hat{S}} = \underline{\underline{R}} \hat{p}$$

Since R is not a square matrix, $\hat{p}$ is substituted for $a$ in equation (1) and both sides of the equation are multiplied by $R^T$ the transpose of R, so that $(R^T R)$ is square as set forth below:

$$\underline{\underline{R}}^T \underline{S} = (\underline{\underline{R}}^T \underline{\underline{R}}) \underline{p} \qquad (2)$$

Typically, there is at least one actuator mode or pattern that is unobservable so as to create a singular $(R^T R)$ matrix. This can occur when all the actuators are poked by equal amounts simultaneously, such that the wavefront is still flat and the measured slopes are all zero. The preferred method to solving equations with singular matrices, such as equation (2), is via singular-value-decomposition (SVD), as described in section 2.6 of *Numerical Recipes in C= The Art of Scientific Computing* referenced above and which is also available as a package in The MathWorks' Inc.'s MATLAB product. SVD decomposes the matrix $R^T R$ into other matrices, which are easier to invert. A summary of this method is as follows:

$$UDU^T = SVD(R^T R) \qquad (3)$$

where

U is a unitary matrix, so its inverse, $U^I$, is its transpose, $U^T$; and

D is a diagonal matrix, with each diagonal element corresponding to a particular mode. If a mode is singular, its diagonal element will be zero (or nearly zero, due to round-off errors in the computer). In such a case, a "pseudo inverse" of D, $D^I$, is used whose diagonal elements are the reciprocals of the non-singular diagonal elements of D, with zeros for the singular values. This causes the singular modes to be ignored.

Thus, the reconstructor matrix, W, is computed as follows:

$$W = (R^T R)^I R^T = (U D^I U^T) R^T \qquad (4)$$

and the solution to equation (2) is then computed as follows:

$$\hat{p} = W \underline{S} \qquad (5)$$

The negative of $\hat{p}$ then represents an estimate of the wavefront phase. After the estimate of the wavefront phase has been computed, a wavefront controller or control system 27 is used to filter out the noise. Since the wavefront being measured is usually changing at a slower rate than the wavefront slope sensor measurements are being taken, the time sequence of phase estimates can be processed to reduce the influence of the noise on the correction signals.

The wavefront control system 27 consists of one or more processors, software to implement the control algorithm described below, and a digital to analog converter to generate the voltages to be applied to the wavefront corrector 28. The wavefront control system 27 is partially characterized by its bandwidth frequency and by its stability. Wavefront phase disturbances of temporal frequencies below the bandwidth are approximately corrected for, while phase disturbances of temporal frequencies above the bandwidth frequency are approximately ignored. Likewise, the portion of the noise below the bandwidth frequency is passed approximately along with the phase correction, and the portion of the noise above the bandwidth frequency is approximately filtered out. The control system performance is limited by the signal-to-noise ratio of the wavefront slope sensor measurements, and by the time it takes the one or more processors of the wavefront reconstructor 26 to compute the slopes and to reconstruct the wavefront. These factors can lead to instability, so they limit the bandwidth and the particular design and performance of the control system.

In the usual implementation of control systems in adaptive optics, the same control system equations are applied to each actuator of the wavefront corrector. For many adaptive optics applications, however, a low signal contributes to noisy estimates of the phase of the wavefront at the actuators. The lowest signal-to-noise ratio actuators are typically edge actuators (i.e., those actuators around the outer aperture of the telescope, around interior obscurations, or in the vicinity of struts) because some of the lenslets/subapertures imaged near these actuators are partially obscured, and/or because there are less valid subapertures imaged near such actuators. The stability of the control system for these noisy phase estimates then limits the stability of all the phase estimates. This in turn limits the bandwidth and the performance of the overall adaptive optics control system.

In accordance with the present invention, the wavefront control system 27 selectively applies a distinct bandwidth to each actuator or correction signal based on the signal-to-noise ratio of the corresponding estimated phase computed by the wavefront reconstructor 26. In particular, the bandwidth is lowered for low signal-to-noise ratio actuators, such as the edge actuators, and raised for high signal-to-noise actuators. There may be "typical" signal-to-noise ratios between the low and high signal-to-noise ratios in which the bandwidth is neither lowered or raised. In one embodiment, low signal-to-noise ratios are less than 5, typical signal-to-noise ratios range between 5 and 10, and high signal-to-noise ratios are greater than 10. It can be appreciated, however, that any signal-to-noise ratio values may be used to classify low, typical and high signal-to-noise ratios, and that a different classification scheme other than low, high and typical may be used. Also, rather than classifying the signal-to-noise ratios as low, typical, and high, the bandwidth of each actuator correction signal may be set proportional to the signal-to-noise ratio of its estimate, as described below. This allows for an increase in the average bandwidth and more filtering of the noisiest estimates, while maintaining or improving stability. The performance improvement can be significant, since typically there are only a minority of low signal-to-noise ratio actuators.

The signal-to-noise ratio of each actuator's phase estimate can be computed as follows. From equation 5 above, the estimate of the phase at each actuator can be written as follows:

$$a_k = \sum_{i=1}^{M} w_{ki} s_i \qquad (6)$$

where $w_{ki}$ is the element in the $k^{th}$ row and $i^{th}$ column of the reconstructor matrix, W and $s_i$ is $i^{th}$ measured slope. Typically, this sum is dominated by the slopes measured in the subapertures neighboring the actuator.

It is well-known in statistics that the variance of a sum is the sum of the variances and that the variance of a coefficient times a random variable is the square of the coefficient times the variance of the random variable. The variance of each slope measurement includes shot noise (its variance equals the signal) and read noise as set forth below:

$$\sigma_i^2 = (p_i + \sigma_r^2) \qquad (7)$$

where $p_i$=the signal of the $i^{th}$ slope measurement (in photoelectrons) and $\sigma_r^2$ is the variance of the read and dark-current noise, which is usually the same for all subapertures.

Thus, the signal-to-noise ratio (SNR) for each actuator, k, can be computed as follows:

$$SNR_k = \frac{\sum w_{ki} p_i}{\sqrt{\sum w_{ki}(p_i + \sigma_r^2)}} \qquad (8)$$

The control system for computing the actuator commands can be written as a combination of the past actuator commands and the current and past reconstructed phase estimates, as given by this equation:

$$b_{k,t} = \sum_{j=1}^{J} c_{k,j} b_{k,t-j} + \sum_{l=0}^{L} g_{k,l} a_{k,t-l} \qquad (9)$$

where $b_{k,t}$=the command for actuator k at time t (counted in iterations);

$a_t$=the phase estimate from the reconstructor for actuator k at time t (counted in iterations); and $c_{k,j}$ and $g_{k,l}$ are control system coefficients.

If the control system is a simple integrator that uses only the current reconstructed phase estimates, then the equation may be written as follows:

$$b_{k,t} = b_{k,t-1} + g_k a_{k,t} \qquad (10)$$

where $g_k$ is the control system "gain" for actuator $b_k$.

The SNR can be used to adjust the $g_{k,l}$ coefficients. The SNR optimized gains are then calculated as follows:

$$g_{k,l} = \frac{SNR_k}{SNR_0} g_l \qquad (11)$$

where $g_l$ is the nominal gain of the control system (not adjusted for SNR) and $SNR_0$ is the nominal SNR of the wavefront sensor.

While the invention has been illustrated and described in connection with several preferred embodiments, it will be appreciated that further changes can be made therein without departing from the spirit and scope of the invention. For example, while the invention has been discussed with reference to a telescope and the atmosphere, it applies to any device and in connection with any medium involving optical wavefronts which are subject to distortion, including without limitation any imaging or laser systems. Accordingly, it is intended that the scope of the invention not be limited by the disclosure of the preferred embodiments, but instead be determined entirely by reference to the claims that follow.

I claim:

1. An adaptive optics control system for distorted optical wavefronts, comprising:
   a wavefront corrector having a surface controlled by a plurality of actuators;
   a wavefront slope sensor having subaperture separation means for defining a plurality of subapertures through which the distorted wavefront can pass, each subaperture corresponding to each actuator of the wavefront corrector, the wavefront slope sensor being adapted to measure the wavefront slope through each subaperture and generate a wavefront slope sensor output signal for each subaperture indicative of the distortion of the wavefront;
   a wavefront reconstructor adapted to receive the wavefront slope sensor output signals and calculate a phase estimate for each of the actuators of the wavefront corrector, the phase estimate having a signal-to-noise ratio, the wavefront reconstructor being further adapted to generate a plurality of correction signals, each having a bandwidth, based on said phase estimates; and
   a wavefront controller adapted to selectively adjust the bandwidth of each correction signal based on the signal-to-noise ratio of the estimated phase calculated by the wavefront reconstructor.

2. The system of claim 1, wherein the wavefront controller is adapted to reduce the bandwidth of the correction signals for actuators having corresponding phase estimates with a low signal-to-noise ratio, and increase the bandwidth of the correction signals for actuators having corresponding phase estimates with a high signal-to-noise ratio.

3. The system of claim 2, wherein the correction signals associated with low signal-to-noise ratios comprise correction signals associated with signal-to-noise ratios less than a first value and the correction signals associated with high signal-to-noise ratios comprise correction signals associated with signal-to-noise ratios greater than a second value.

4. The system of claim 3, wherein the first value is 5, and the second value is 10.

5. The system of claim 1, wherein the bandwidth of each correction signal is proportional to the signal-to-noise ratio of the corresponding estimated phase.

6. The system of claim 1, wherein the wavefront reconstructor comprises at least one microprocessor.

7. The system of claim 1, wherein the wavefront corrector comprises a deformable mirror.

8. The system of claim 1, wherein the wavefront corrector comprises a spatial light modulator.

9. The system of claim 1, wherein the subaperture separation means comprises an array of lenslets and a corresponding detector array having a plurality of pixels disposed behind each lenslet, each lenslet defining a subaperture.

10. The system of claim 1, wherein the subaperture separation means comprises a lateral shearing interferometer.

11. The system of claim 1, wherein the wavefront slope sensor comprises means for individually calibrating each wavefront slope measured by the wavefront slope sensor.

12. A method of optical wavefront distortion correction using a wavefront corrector having a surface controlled by a plurality of actuators, the method comprising:
measuring the distortion of the wavefront with a wavefront slope sensor having subaperture separation means for defining a plurality of subapertures through which the distorted wavefront can pass, each subaperture corresponding to each actuator of the wavefront corrector, the wavefront slope sensor being adapted to measure the wavefront slope through each subaperture and generate a wavefront sensor output signal for each subaperture indicative of the distortion of the wavefront;
calculating a phase estimate for each of the actuators of the wavefront corrector based on the wavefront sensor output signals, each phase estimate having a signal-to-noise ratio;
generating a plurality of correction signals to be applied to each actuator based on the phase estimates, each correction signal having a bandwidth; and
selectively adjusting the bandwidth of each correction signal based on the signal-to-noise ratio of the corresponding estimated phase.

13. The method of claim 12, wherein the step of selectively adjusting comprises adjusting the bandwidth of each correction signal to be proportional to the signal-to-noise ratio of the corresponding estimated phase.

14. The method of claim 12, further comprising:
reducing the bandwidth of correction signals of actuators having corresponding phase estimates with a low signal-to-noise ratio; and
increasing the bandwidth of correction signals of actuators having corresponding phase estimates with a high signal-to-noise ratio.

15. The method of claim 14, wherein the correction signals associated with low signal-to-noise ratios comprise correction signals associated with signal-to-noise ratios less than a first value, and the correction signals associated with high signal-to-noise ratios comprise the correction signals associated with signal-to-noise ratios greater than a second value.

16. The method of claim 15, wherein the first value is 5, and the second value is 10.

17. The method of claim 12, further comprising individually calibrating each wavefront slope measured by the wavefront slope sensor.

18. The method of claim 12, wherein the step of calculating a phase estimate comprises representing the wavefront corrector and wavefront slope sensor measurements as a plurality of linear equations in a matrix format.

19. The method of claim 12, wherein the subaperture separative means comprises an array of lenslets and a corresponding detector array having a plurality of pixels disposed behind each lenslet, each lenslet defining a subaperture.

20. The method of claim 12, wherein the subaperture separation mechanism comprises a lateral shearing interferometer.

* * * * *